March 24, 1936. C. C. BENZ 2,034,891
PROCESS AND APPARATUS FOR FRACTIONATING LIQUIDS
Filed July 9, 1934 2 Sheets-Sheet 1
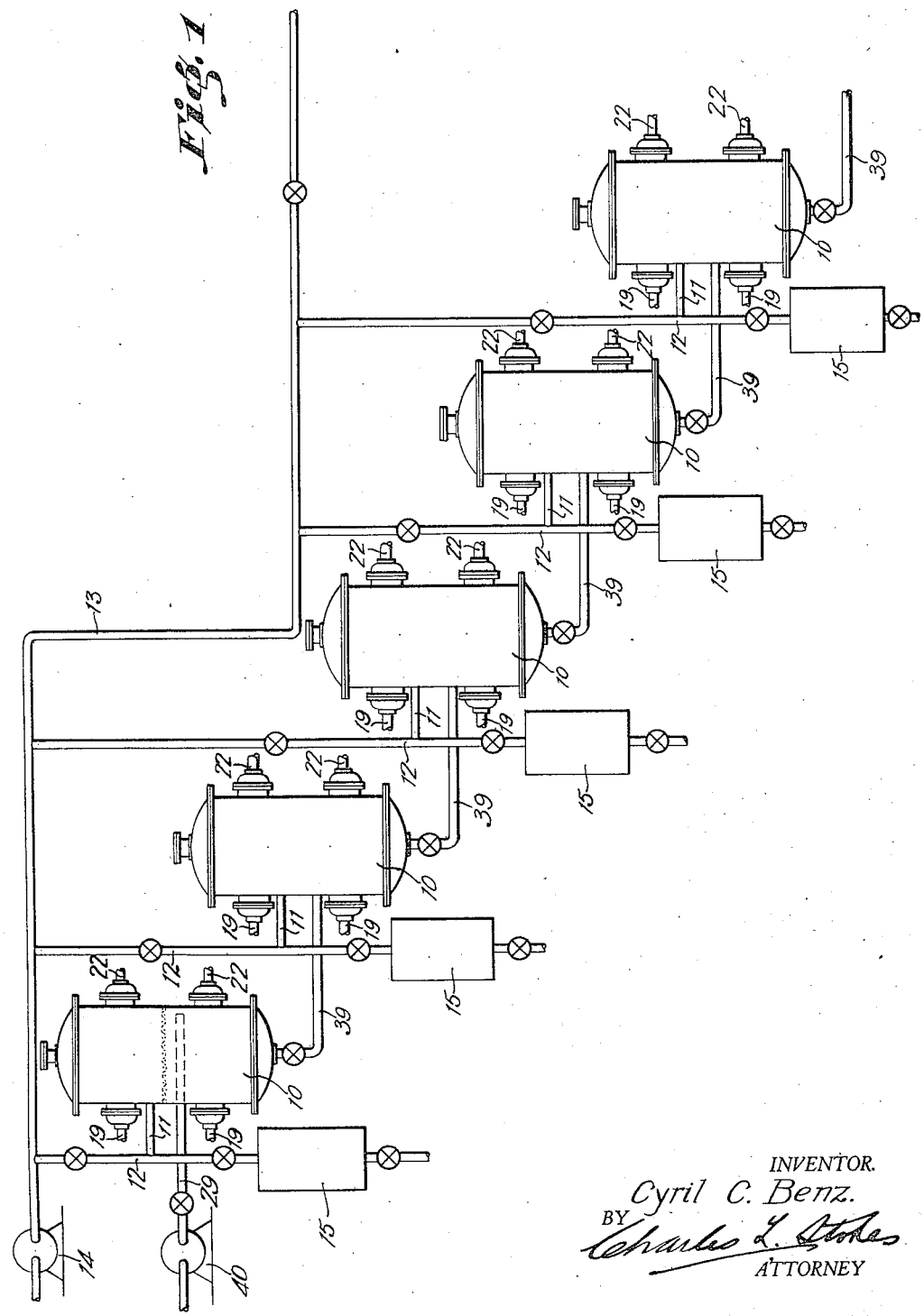
INVENTOR.
Cyril C. Benz.
BY
ATTORNEY March 24, 1936.  C. C. BENZ  2,034,891
PROCESS AND APPARATUS FOR FRACTIONATING LIQUIDS
Filed July 9, 1934  2 Sheets-Sheet 2
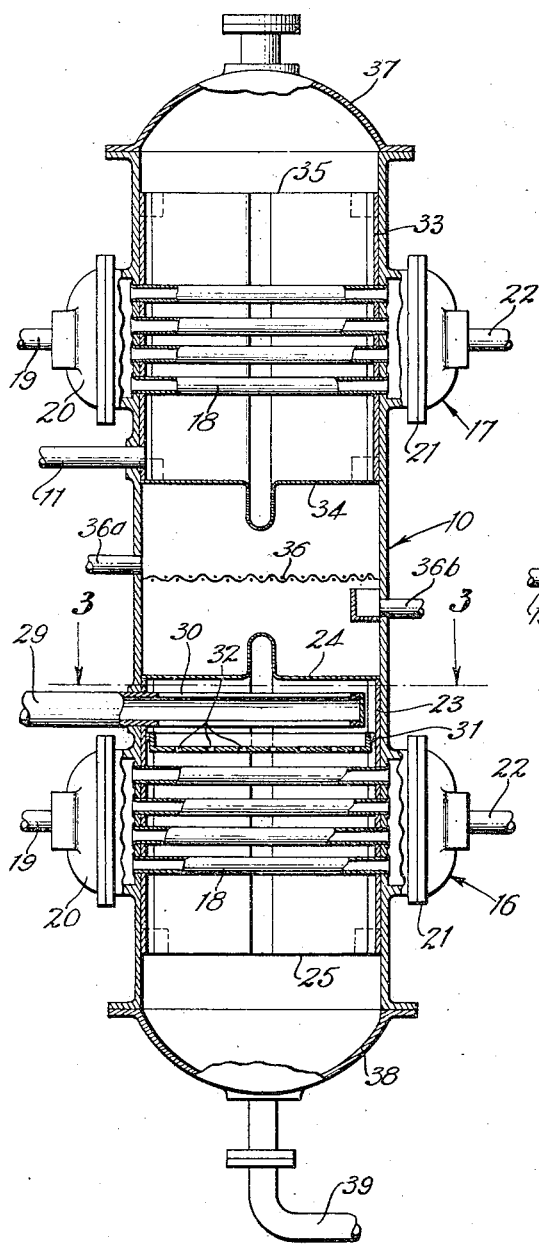
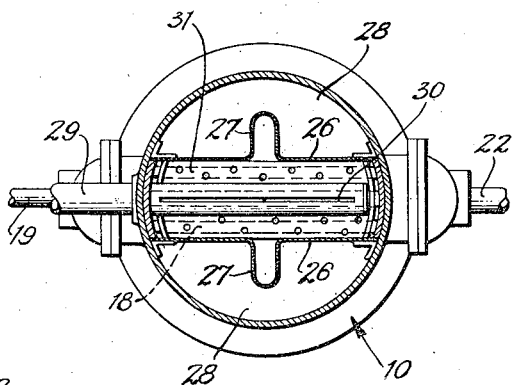
INVENTOR.
Cyril C. Benz.
BY
ATTORNEY Patented Mar. 24, 1936

2,034,891

UNITED STATES PATENT OFFICE 2,034,891

PROCESS AND APPARATUS FOR FRACTIONATING LIQUIDS

Cyril C. Benz, Long Beach, Calif.

Application July 9, 1934, Serial No. 734,333

22 Claims. (Cl. 196—77)

This invention relates to a process of fractionating liquids composed of a plurality of fractions having different boiling points and has for its principal object the separation of a complex mixture of hydrocarbons.

Another object is the fractional distillation and condensation of heavy hydrocarbon mixtures, such as lubricating oils, under high vacua whereby decomposition is prevented and the quality of the oil is preserved.

Another object is the vacuum distillation of oils wherein high vacua are maintained.

Another object is to provide a single apparatus for vacuum distillation and condensation wherein the vacuum is maintained with a minimum pressure drop therethrough.

Another object is to provide for the introduction of certain anhydrous chemicals, with the oil undergoing distillation to provide a certain neutralization of impurities in the oil and polymerization of certain hydrocarbons which are undesired in the finished product.

Other objects will become apparent as my invention becomes more fully disclosed.

Referring to the drawings:

Fig. 1 is a diagrammatic flow sheet illustrating a continuous process of fractional distillation and condensation under high vacua.

Fig. 2 is a vertical sectional view of units used in Fig. 1.

Fig. 3 is a view along the lines 3—3 of Fig. 2.

In the vacuum distillation of lubricating oils at the present time many difficulties are encountered, such as the drop in vacuum during distillation due to leaks in piping and friction in same, localized overheating in the apparatus causing cracking, the hydrostatic head of the body of oil under treatment, and many other disturbing factors.

This invention overcomes such known difficulties by providing efficient heat exchange through a film of oil and maintaining the movement of the generated oil vapors through heating units in a passage parallel to the flow of oil therethrough, thus utilizing the partial pressure and stripping effects of the lighter vapors to help strip the heavier oils.

Further the applied vacuum is maintained in a single apparatus with minimum pressure drop by passing the vapors through a single shell wherein free and open communication is maintained with a contained condensing section.

In Fig. 1, a series of shells 10 is illustrated, each having a pipe 11 connected through a conduit 12 to a main 13 for applying vacuum thereto by means of a pump 14. Vacuum is also applied through conduit 12 to receivers 15 which retain selected fractions from each shell as condensed and withdrawn therefrom.

In Figs. 2 and 3, each shell 10 is provided with a lower heating section 16 and an upper condensing section 17, both of which are of generally similar construction containing a plurality of tubes 18 affording free flow of a heating medium, such as steam, hot oil, or the like, and a cooling medium, such as water, cold oil, ammonia, or the like, from a supply pipe 19 to an inlet header 20, thence through tubes 18 to an outlet header 21 and a discharge pipe 22.

Tubes 18 are fixed in any suitable and leakproof manner in the walls of shell 10 and are of sufficient size and number to give the desired heat exchange for effecting the results of this invention.

Tubes 18 in heater section 16 are contained inside shell 10 by a box 23 having a closed top 24, an open bottom 25, and side walls 26 containing expansion corrugations 27, said box being suitably supported on the interior wall of shell 10 and being of such dimensions as to leave free open spaces 28 for the flow of vapors between side walls 26 and the interior wall of shell 10.

An oil supply pipe 29, containing a plurality of slots 30, is led into the upper part of box 23 and adapted to discharge the oil into a distributing tray 31 containing a plurality of orifices 32 whereby the oil is caused to flow down and over the surfaces of heating tubes 18 in film form.

Condenser section 17 is similarly constructed to section 16 but has its tubes 18 contained in a box 33 which has a closed bottom 34 and an open top 35, said bottom 34 forming a collecting pan for condensate into which pipe 11 is led for the withdrawal of the same and for the continuous application of vacuum to the shell. A screen 36, which may be a fractionating plate, is set centrally of the shell to prevent entrainment, etc., and each shell 10 has an upper closure 37 and a lower closure 38 into which latter a pipe 39 is fitted to withdraw the bottoms to a succeeding shell for redistillation by gravity, or otherwise.

In operation, a heating medium is passed through each heater section 16 and a cooling medium is passed through each condensing section 17, the temperature of each being such as to strip and condense a desired cut of the lightest fraction in the first shell 10, the charging stock being supplied to pipe 29 by a pump 40.

The oil flows through orifices 32 down and over the heating tubes 18 in film form, being aided therein by gravity and the effect of high vacua induced by pump 14 which may be of the order in pressure of from 1 to 15 millimeters of mercury for lubricating crude, but which may be higher for other fractionating operation.

The flow of oil in film form over heating tubes 18 and the consequent vaporization thereof due to efficient heat transfer permits the partial pressure effects of the vapors at the desired temperature to reduce the heavier oil to a desired cut and also permits the heavy unvaporized oil to carry any solids in suspension due to its velocity, such solids for instance being clays, treatment chemicals or the like.

The desired cut in vapor form and with substantially unimpaired velocity passes out of the bottom of heating box 23 through the passages 28, through plate 36, and over the top 35 of condenser section 17 to be efficiently contacted with the cooling surfaces of cooling tubes 18 and condensed. The condensate, comprising a desired light narrow cut, then flows through pipe 11 into the first receiver 15 to be withdrawn therefrom as desired while the heavier bottoms in liquid form flow through pipe 39 to the second shell 10 to be subjected to similar steps, as already described.

The temperatures in succeeding shells 10 will be continually raised to the last shell so that the resulting bottoms from the last shell may be only five per cent of the original stock supplied through pipe 29 and in this manner with twenty shells 10, a five per cent cut can be taken off in each.

The screen or plate 36 is supplied with reflux condensate from a suitable source and under the proper pressure through a pipe 36a, which condensate by its washing effects on screen 36 gives better fractionation by taking out the heavier ends which may be discharged under suitable pressure control through a pipe 36b to a place of use. For instance, reflux condensate may be supplied from pipe 11 to pipe 36a, and pipe 36b may be discharged into the upper end of heating box 23.

While screen 36 may not be always utilized, at the same time its fractionating effects are often a material aid in the process and it is designed to give a minimum pressure drop therethrough and the pressure drop through the shell 10 is far less than any heretofore known systems. This is accomplished by passing the mixture of liquids to be vaporized from a conduit through an enlarged pasageway 10 in which are located the heating and condensing sections 16 and 17 designed to such end that the passage of vapors from one unit to the other is substantially unrestricted in accordance with the cross-sectional areas designed.

A particular instance when screen 36 is not utilized may be when the positions of boxes 23 and 33 are reversed in shell 10, in which event outlet pipe 39 will be connected to an outlet tray of smaller diameter than the interior diameter of shell 10 and suspended beneath bottom 25 in the reversed position, but all such changes are apparent as mere reversal of parts and fall within the scope of the invention.

By joining a series of shells, as described, continuous vacuum distillation under high maintained vacua is possible with effective fractionation, a result heretofore greatly desired.

The treatment chemicals hereinbefore referred to as being carried in suspension by the unvaporized oil in film form over tubes 18 include finely ground, or pulverized, alkali metal, or alkaline earth metal, oxides such as $Na_2O$, $K_2O$, MgO, CaO, BaO, SrO, likewise the hydroxides, or the carbonates of such metals may be used under varying conditions.

Such oxides, or equivalents, are crushed as fine as may be done and thoroughly mixed by any suitable form of agitation with the oil prior to introduction through pipe 29 and serve to neutralize certain undesired organic impurities in the oil such as phenols, naphthenic acids and the like to prevent distillation of the same with the desired overhead.

Likewise, such oxides, or equivalents, serve to polymerize certain groups of hydrocarbons, the elimination of which adds greatly to the stability of the finished overhead product.

This application is a continuation-in-part of my co-pending application, Serial No. 458,360, filed May 31, 1930.

I claim as my invention:

1. A process for the distillation of hydrocarbons which comprises: flowing a stream of oil in film form through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, and separating the vapors and liquids after passage through the heating zone.

2. A process for the distillation of hydrocarbons which comprises: flowing a stream of oil in film form vertically downwardly through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, and separating the vapors and liquids after passage through the heating zone.

3. A process for the distillation of hydrocarbons which comprises: flowing a stream of oil in film form through a heating zone to receive heat at such a temperature while under sub-atmospheric pressure that substantial decomposition is prevented, directing all the vapors evolved from the oil to travel in the same direction and in enveloping contact with said film completely through the heating zone whereby the partial pressure effects of the vapors aid in stripping the liquids, and separating the vapors and liquids after passage through the heating zone.

4. A process for the continuous distillation of liquid hydrocarbons without substantial decomposition which comprises subjecting a continuously moving stream of said hydrocarbons to progressively increasing degrees of heat at selected zones in said stream while said stream is in film form in said zones, causing all the vapors evolved from the hydrocarbons in each zone to travel in the same direction and in enveloping contact with the film in each zone whereby the partial pressure effects of the vapors aid in stripping the liquids, separating the vapors from the stream after passage through each zone, and maintaining subatmospheric pressure on each of said zones.

5. A process for the continuous distillation of liquid hydrocarbons without substantial decomposition which comprises subjecting a continuously moving stream of said hydrocarbons to progressively increasing degrees of heat at selected zones in said stream while said stream is in film form in said zones, causing all the vapors evolved from the hydrocarbons in each zone to travel in the same direction and in enveloping contact with the film in each zone whereby the partial pressure effects of the vapors aid in stripping the liquids, separating the vapors from the stream after passage through each zone, and maintaining the same subatmospheric pressure on each of said zones.

6. A process for the continuous distillation of liquid hydrocarbons without substantial decomposition which comprises subjecting a continuously moving stream of said hydrocarbons to progressively increasing degrees of heat at selected zones in said stream while said stream is in film form in said zones, causing all the vapors evolved from the hydrocarbons in each zone to travel in the same direction and in enveloping contact with the film in each zone whereby the partial pressure effects of the vapors aid in stripping the liquids, separating the vapors from the stream after passage through each zone, and maintaining subatmospheric pressure on each of said zones less than 25 m.m. of mercury.

7. A process for the distillation of hydrocarbons which comprises: flowing a stream of oil containing finely ground alkaline material in film form through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, and separating the vapors and liquids after passage through the heating zone.

8. A process for the distillation of hydrocarbons which comprises: flowing a stream of oil containing finely ground anhydrous alkaline material in film form through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, and separating the vapors and liquids after passage through the heating zone.

9. A process for the distillation of hydrocarbons which comprises: flowing a stream of oil containing pulverized $Na_2O$ in film form through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, and separating the vapors and liquids after passage through the heating zone.

10. A process for the distillation of hydrocarbons which comprises: flowing a stream of oil in film form through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, separating the vapors and liquids after passage through the heating zone, passing the vapors to and through a condensing zone with no substantial pressure drop and maintaining the same subatmospheric pressure on both zones.

11. A process for the distillation of hydrocarbons which comprises: flowing a stream of oil in film form through a heating zone to receive heat at such a temperature while under sub-atmospheric pressure that substantial decomposition is prevented, directing all the vapors evolved from the oil to travel in the same direction and in enveloping contact with said film through the heating zone whereby the partial pressure effects of the vapors aid in stripping the liquids, separating the vapors and liquids after passage through the heating zone, passing the vapors to and through a condensing zone with no substantial pressure drop, washing the vapors in passing between the zones with hydrocarbon distillate, and maintaining the same sub-atmospheric pressure on both zones.

12. In a fractionating system for lubricating, or heavy, hydrocarbons, the combination with a shell of means to apply heat within a portion thereof, means to restrictedly supply liquids to said heating means to form a film thereon and vaporize some of the liquids without substantial decomposition, means to cause all the vapors to move in the same direction and in enveloping contact with the liquids downwardly through the heating means whereby the partial pressure effects of the vapors aid in stripping the liquids, means to separate the vapors and liquids, means to condense the vapors without permitting admixture of further heavier vapors therewith, and means to apply sub-atmospheric pressure throughout the interior of the shell whereby a substantially uniform vacuum is maintained on all parts of said oil film.

13. In a fractionating system for lubricating, or heavy, hydrocarbons, the combination with a vertical elongated shell of means to apply heat to a lower portion thereof, means to supply liquids to said heating means within the shell and in film form to vaporize some of the liquids without substantial decomposition, means to cause the vapors and liquids to move concurrently downwardly through the heating means whereby the partial pressure effects of the vapors aid in stripping the liquids, means to reverse the flow of vapors to separate out the liquids, means to condense the vapors in the upper part of the shell without permitting admixture of further heavier vapors therewith, and means to apply sub-atmospheric pressure throughout the interior of the shell whereby a substantially uniform vacuum is maintained on all parts of said oil film.

14. A process of fractionation which comprises: flowing a stream of heavy liquid hydrocarbons such as lubricating stock in film form in the same direction and downwardly in enveloped contact with all of the vapors generated therefrom through a heating area in a closed unitary system without substantial decomposition whereby the partial pressure effects of the vapors aid in stripping the liquid hydrocarbons, separating said vapors from said liquids after passage through said heating area, and passing said vapors through a condensing area in said system; the flow of vapors through the heating area and the condensing area being substantially unrestricted to assure a minimum pressure drop throughout the system responsive to a sub-atmospheric pressure uniformly applied to said film.

15. A process of fractionation which comprises: flowing a stream of heavy liquid hydrocarbons such as lubricating stock in film form in the same direction and downwardly in enveloped contact with all of the vapors generated therefrom through a heating area in a closed unitary system without substantial decomposition whereby the partial pressure effects of the vapors aid in stripping the liquid hydrocarbons, separating said vapors from said liquids after passage through said heating area by reversing the flow of said vapors, and passing said vapors through a condensing area in said system; the flow of vapors through the heating area and the condensing area being substantially unrestricted to assure a minimum pressure drop throughout the system responsive to a sub-atmospheric pressure uniformly applied to said film.

16. A process of fractionation which comprises: flowing a stream of heavy liquid hydrocarbons such as lubricating stock in film form concurrently and downwardly with vapors generated therefrom through a heating area in a closed unitary system without substantial decomposition whereby the partial pressure effects of the vapors aid in stripping the liquid hydrocarbons, separating said vapors from said liquids after passage through said heating area, passing said vapors through a condensing area in said system, and washing the vapors between the heating area and condensing area with hydrocarbon distillate; the flow of vapors through the heating area and the condensing area being substantially unrestricted to assure a minimum pressure drop throughout the system responsive to a sub-atmospheric pressure uniformly applied to said film.

17. In a fractionating system, the combination with a closed shell having a lower container open at the bottom and an upper container open at the top of means to pass a heating medium through the lower container, means to pass a cooling medium through the upper container, means to supply liquids to the upper part of the lower container to be vaporized therein by said heat passing means, and means to apply sub atmospheric pressure to the lower part of the upper container to move said vapors through said cooling means and condense said vapors.

18. In a fractionating system, the combination with a closed shell having a lower container open at the bottom and an upper container open at the top, said containers being in open communication, of means to pass a heating medium through the lower container, means to pass a cooling medium through the upper container, means to supply liquids to the upper part of the lower container to be vaporized therein by said heat passing means, and means to apply subatmospheric pressure to the lower part of the upper container to move said vapors through said cooling means and condense said vapors.

19. In a fractionating system, the combination with a closed shell having a lower container open at the bottom and an upper container open at the top, said containers being in open communication, of means to pass a heating medium transversely through tubes in the lower container, means to pass a cooling medium through tubes in the upper container, means to supply liquids to the upper part of the lower container to be vaporized on said heating tubes, and means to apply sub-atmospheric pressure to the lower part of the upper container to move said vapors over said cooling tubes whereby said vapors are condensed and removed from said shell.

20. In a fractionating system, the combination with a closed shell having a lower container open at the bottom and an upper container open at the top, said containers being in open communication, of means to pass a heating medium transversely through tubes in the lower container, means to pass a cooling medium through tubes in the upper container, means to supply liquids to the upper part of the lower container to be vaporized on said heating tubes, means between said containers to wash said vapors, and means to apply sub-atmospheric pressure to the lower part of the upper container to move said vapors over said cooling tubes whereby said vapors are condensed and removed from said shell.

21. In the vacuum distillation of liquid hydrocarbons that step which comprises passing a film of said hydrocarbons through a heating zone while simultaneously causing all the vapors evolved therefrom to travel in a parallel direction and in enveloping contact therewith responsive to a uniform vacuum applied to said film.

22. In the vacuum distillation of liquid hydrocarbons that step which comprises passing a film of said hydrocarbons containing alkaline material through a heating zone while simultaneously causing all the vapors evolved therefrom to travel in a parallel direction and in enveloping contact therewith responsive to a uniform vacuum applied to said film.

CYRIL C. BENZ.